United States Patent

[11] 3,603,871

| [72] | Inventors | Jeffrey Malcolm Caunter<br>Beaconsfield;<br>Peter Higham, High Wycombe, both of,<br>England |
|---|---|---|
| [21] | Appl. No. | 847,363 |
| [22] | Filed | Aug. 4, 1969 |
| [45] | Patented | Sept. 7, 1971 |
| [73] | Assignee | Perkin-Elmer Limited<br>Beaconsfield, England |
| [32] | Priority | Aug. 9, 1968 |
| [33] | | Great Britain |
| [31] | | 38051/58 |

[54] NUCLEAR MAGNETIC RESONANCE PROBE
9 Claims, 7 Drawing Figs.

| [52] | U.S. Cl. | 324/0.5 R |
|---|---|---|
| [51] | Int. Cl. | G01n 27/78 |
| [50] | Field of Search | 324/0.5,<br>41.43 |

[56] References Cited
UNITED STATES PATENTS
2,908,858  10/1959  Nelson ................... 324/0.5

OTHER REFERENCES

D. E. Abrahamson and C. Heiner - " A Nuclear Induction Head Suitable For Use With A Spin Generator" - Journal of Scientific Instruments - V.39 - 1962 - pp. 513– 514.

*Primary Examiner*—Michael J. Lynch
*Attorney*—Edward R. Hyde, Jr.

ABSTRACT: A predetermined amount of electromagnetic intercoupling is provided between segments of a transmitter winding and a receiver winding in a probe for a nuclear magnetic resonance apparatus. Circuit means are provided for adjusting the amplitude and phase of voltages induced in the receiver winding by each transmitter winding segment causing the induced voltages to oppose and to thereby reduce a standing signal in the receiver winding.

INVENTORS.
Peter Higham
BY Jeffrey M. Caunter

ATTORNEY.

INVENTORS:
Peter Higham
BY Jeffrey M. Cauter

ATTORNEY

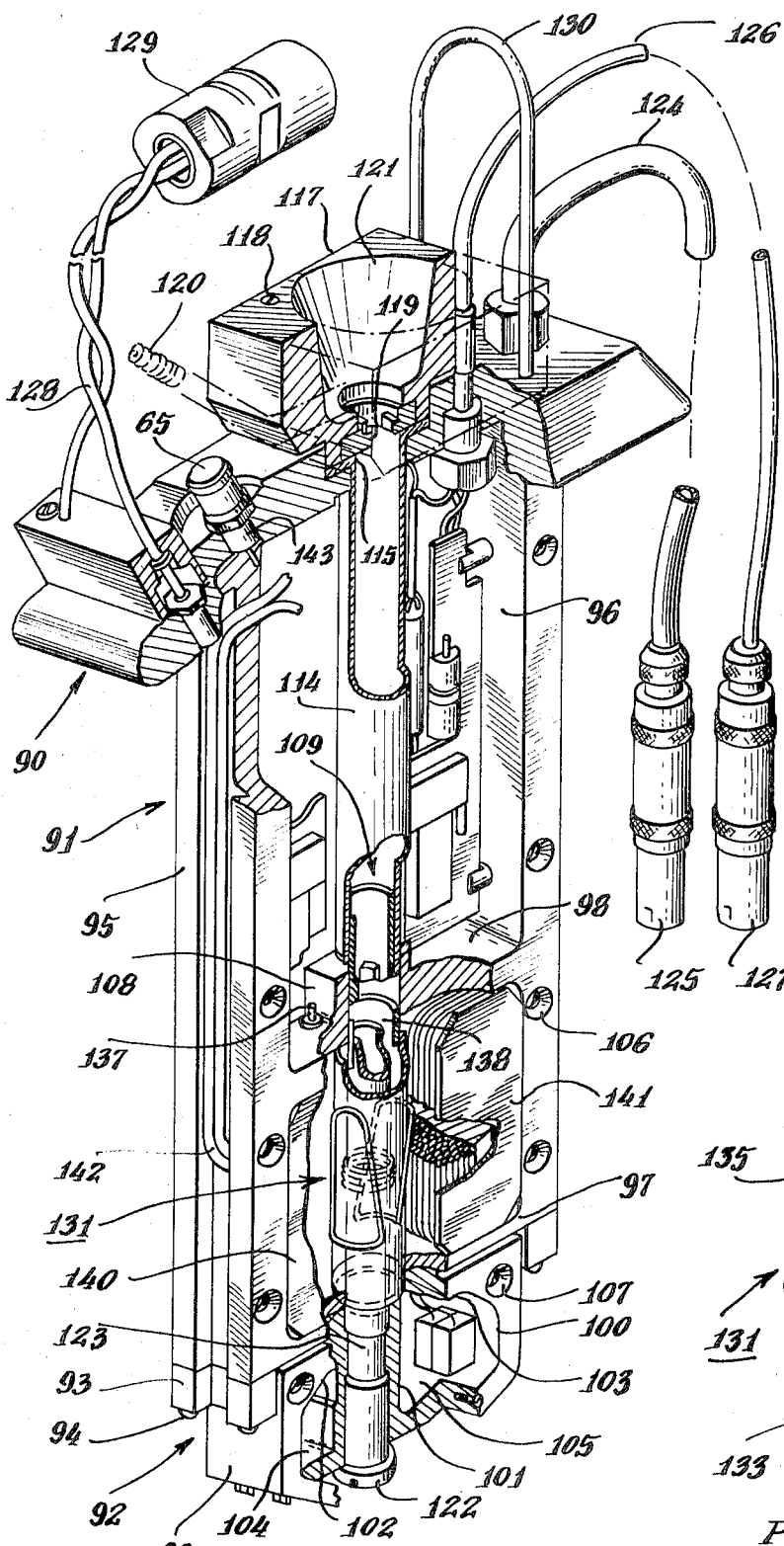
Fig. 4.
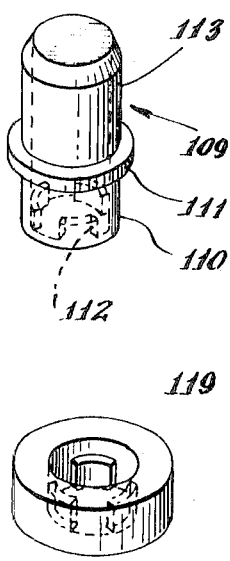
Fig. 5.
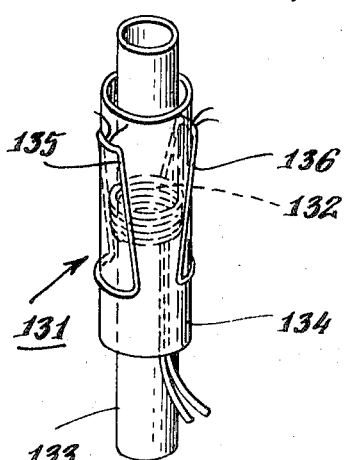
Fig. 6.
Fig. 7.
INVENTORS.
Peter Higham
BY Jeffrey M. Caunter
Frank J. Thompson
ATTORNEY.

NUCLEAR MAGNETIC RESONANCE PROBE

The present invention relates to Nuclear Magnetic Resonance (NMR) apparatus and more particularly to NMR probe arrangements of the crossed-winding type.

A probe arrangement for an NMR apparatus includes a plurality of functionally interrelated electrical and mechanical components located within a housing for positioning in the polarizing magnetic flux of an NMR spectrometer. A sample material under analysis which is positioned in the probe and which is subjected to an intense magnetic flux is irradiated at the Larmour frequency of the sample to cause gyromagnetic variations in the sample. The irradiating field is applied to the sample through a transmitter winding positioned in the probe while a receiver winding also positioned in the probe provides a pickup for receiving the gyromagnetic variation.

In a probe system of the type referred to, the axes of the polarizing field, the transmitter winding and the receiver winding must be substantially orthogonal to one another. A high degree of orthogonality is required to ensure that no appreciable RF energy, or only a small controlled amount as may be required for the technique of homodyning, is transferred electromagnetically to the receiver winding in correspondence of all regions of the NMR spectrum other than those where resonances occur in the sample under analysis. Similarly, transfer by electrostatic induction must be minimized. When the polarizing magnet is of the type defining a working gap between opposed pole pieces, the requirement for orthogonality leads to a probe construction wherein the transmitter winding is divided into two spaced halves and the receiver winding lies therebetween.

In known probe arrangements the effect of electrostatic induction has been reduced by providing a Faraday screen between the transmitter and receiver windings and by providing trimming devices in the form of flux guides or paddles. This prior arrangement reduces the residual electrostatic coupling due to any inefficiency of the Faraday screen and reduces the electromagnetic coupling which exists notwithstanding the high degree of care taken in manufacture for assuring geometric orthogonality of the crossed windings. It is noted here, however, that geometric orthogonality within practical production tolerances does not ensure electromagnetic orthogonality within acceptable limits. These trimming devices are mechanically operated by the displacement of masses of suitable conductive and electrically resistive materials. The effectiveness of the adjustments ultimately depends on the positional accuracy and stability with which said masses are set. The mechanical precision required by this arrangement leads to relatively costly manufacture. This is especially true when, to avoid the inconvenience to the user of direct manipulation of the probe positioned in the polarizing flux, a remote mechanical control is provided.

Accordingly, it is an object of the present invention to provide an improved probe for an NMR apparatus.

Another object of the invention is to provide a probe for an NMR apparatus which facilitates fabrication and set up of the probe.

Another object of the invention is to provide a crossed winding probe which avoids the use of a Faraday shield.

In accordance with the present invention there is provided a crossed winding NMR probe arrangement wherein two spaced halves of a transmitter winding flank an interposed receiver winding and are arranged for parallel feed from a source of irradiating RF potential. The transmitter half windings are arranged in relation to the receiver winding for establishing a predetermined electromagnetic coupling giving rise in the case of one of said halves to an induced voltage in said receiver winding of predetermined sign and amplitude and in the case of the other of said halves to an induced voltage of opposite sing and similar amplitude. Circuit means are provided for adjusting the amplitude and the phase of the RF feed to each of said half windings over a range for causing the voltages induced in the receiver winding by the two halves of the transmitter winding to oppose each other thereby reducing the standing signal in the winding to the desired level in the absence of an NMR resonance.

A predetermined amount of electromagnetic coupling between transmitter winding halves and the receiver winding is provided in one embodiment of the invention by inclining the two halves substantially symmetrically toward the interposed receiver winding from a position in which the magnetic axis of the two halves are coincident and intersect the axis of the receiver winding at right angles, i.e., from the position of geometric orthogonality. In another embodiment, the winding halves are shaped in a manner which causes them to be operationally equivalent to winding halves inclined in the above manner. A particular embodiment is provided by winding the halves in the configuration of a trapezium. In still another embodiment the mechanical trimming devices of the prior art are also utilized, which in this arrangement would not suffer from the disadvantages referred to earlier since they would be required to provide a comparatively noncritical preset adjustment and no more, the accuracy of the final setting being determined by the electrical trimming devices.

Electrical and mechanical asymmetries resulting from the manufacture and assembly of the two halves of the transmitter winding and the interposed receiver winding are responsible for a residual coupling in which the electromagnetic induction vectors from the one and the other half, respectively, may happen to be so oriented that phase and amplitude adjustments by electrical trimming devices are not capable of establishing electromagnetic orthogonality. The predetermined electromagnetic coupling established in accordance with the present invention swamps the effect of accidental asymmetries and superimposes a coupling of greater magnitude in which the induction vectors are invariably of opposite sing and therefore capable of being trimmed out electrically. Too little inclination, or its equivalent, of the transmitter winding halves may at times not be adequate for swamping effectively manufacturing asymmetries while, on the other hand, too great an inclination produces inhomogenieties in the irradiation flux from the winding halves. However, accidental asymmetries would have to be gross for them to require an inclination that the flux distributed would be adversely affected. The amount of predetermined coupling required is relatively small and is arrived at by trial and error. Although no greater coupling than necessary will in general be provided, a coupling significantly in excess of the minimum can be tolerated without a significant change in responsiveness.

Feeding the two transmitter winding halves in parallel advantageously provides a high degree of independence for phase and amplitude adjustment, such as by interposing a comparatively high impedance between RF source and each winding half. Both the two amplitude and the two phase adjustments may be arranged for differential control. In this manner, the instrument operator may rapidly achieve probe balance by operating one control knob with the left hand and one with the right, while observing some suitable balance detector.

Remote control through the use of circuit means including electrical trimming devices as described hereinafter is desirable and eliminates the disadvantage of long RF feeders. These devices acting as resistors and capacitors are capable of being varied over a useful range by the application thereto of adjustable DC potentials.

We have found in a probe arrangement constructed in accordance with features of the present invention, that the Faraday screen normally interposed between the two transmitter halves and the receiver winding can be dispensed with. It appears that the inclination, or its equivalent, of the winding halves produces a slight unbalance of one or other sign in the electromagnetic vectors to offset the electrostatic induction effect. Elimination of the electrostatic screen imports great manufacturing simplification and in itself lessens the problem of achieving electromagnetic orthogonality insofar as it enables less RF irradiation power to be used.

By providing a relatively small controlled amount of electromagnetic coupling and offsetting it by means of electrical trimming devices in accordance with features of the present invention, the costly and less easily balanced systems of the prior art are avoided and at the same time adjustments rapidly converging towards an optimum setting are carried out at any reasonable distance e.g. a panel in a console several feet away from the polarizing NMR magnet. Although the advantages are particularly marked in a remote control situation, they are nevertheless substantial even when the electrical trimming devices are arranged to be operated directly on the probe itself.

These and other objects and features of the invention will become apparent with reference to the following specifications and drawings, wherein:

FIG. 4 is a diagram partly cut away and partly in section illustrating a probe arrangement constructed in accordance with features of the present invention;

FIG. 5 is an enlarged view of a bushing of the probe of FIG. 4;

FIG. 6 is an enlarged view of a bearing ring of the probe of FIG. 4; and,

FIG. 7 is an enlarged view of a transmitter and receiver winding assembly of FIG. 4.

Figure 1:
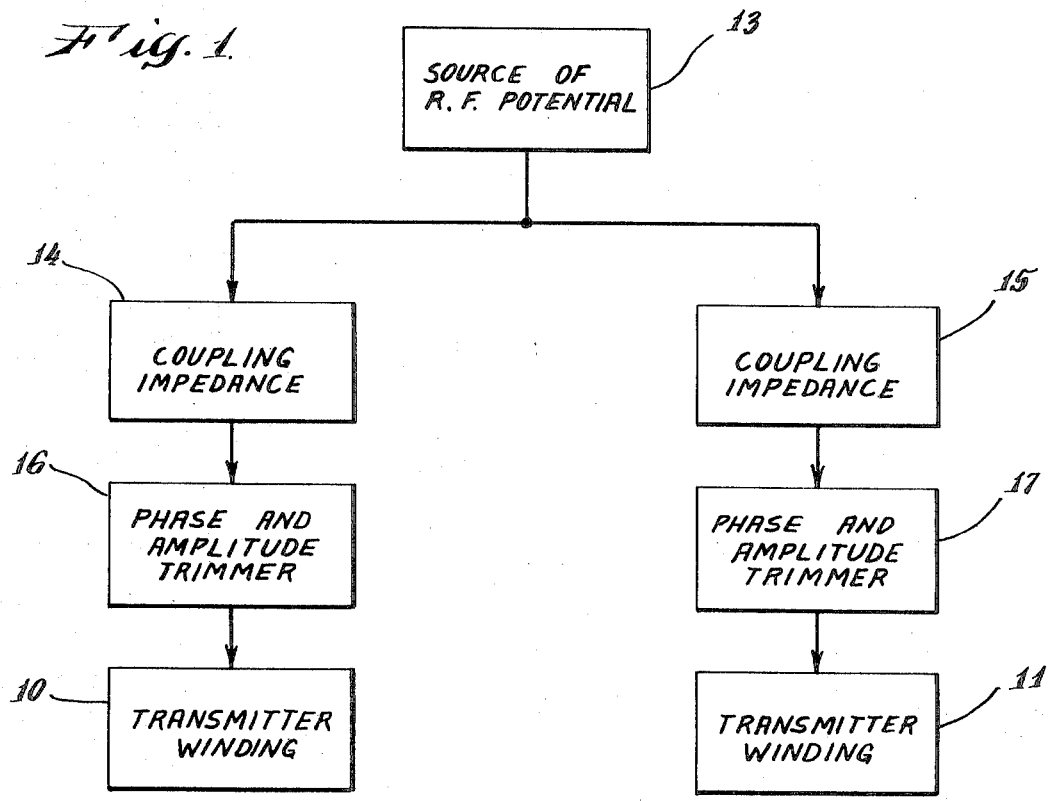
FIG. 1 is a diagram in block form of a probe arrangement illustrating an embodiment of the present invention.
Figure 2:
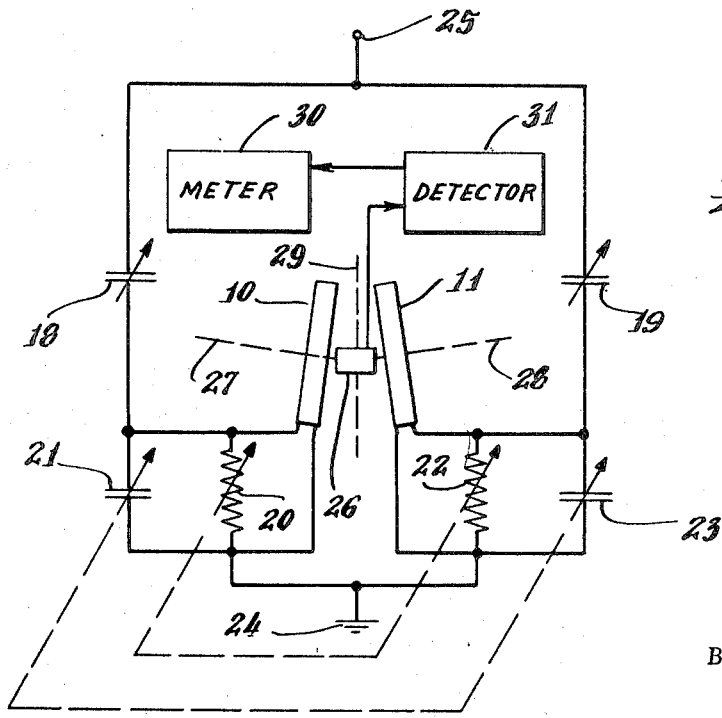
FIG. 2 is a diagram partly schematic and partly in block form of the probe arrangement of FIG. 1.

Referring now to FIG. 1, two halves 10 and 11 of a transmitter winding for an NMR apparatus are shown fed in parallel from a common source 13 of RF potential, which is external to the probe, via impedances 14 and 15 that are high compared with the impedance of the source 13 and via phase and amplitude trimming circuit means 16 and 17. In FIG. 2, the high impedances 14 and 15 are represented by variable capacitors 18 and 19 respectively, and the trimming circuit means comprises a combination of a variable resistor 20 and a capacitor 21 and a combination of a variable resistor 22 and capacitor 23. The resistor and capacitor combination 20 and 21 is shunted across the winding half 10 and the resistor and capacitor combination 22 ans 23 is shunted across winding half 11. The winding halves have a common earth point 24, and, an input terminal 25, between which the irradiating RF source is coupled in operation for application of an RF irradiating voltage to the transmitter winding halves.

The winding halves 10 and 11 are arranged to provide a degree of electromagnetic coupling with a receiver winding 26 by virtue of the fact that their magnetic axes, represented in FIG. 2 by dotted lines 27 and 28 respectively, are symmetrically inclined with respect to the axis represented by dotted line 29 of the receiver winding 26. The inclination has been accentuated in FIG. 2 for a clearer understanding, but in practice it would be much less than shown in this figure. Because of the nature of the winding inclination, electromagnetic induction vectors arising from the two winding halves are of opposite signs and similar amplitudes and in operation corresponding voltages will be set up in the receiver winding 26.

There is also present in the voltage induced in the receiver winding a significant component due to electrostatic induction, since in this probe arrangement a Faraday screen is not interposed between the transmitter and receiver windings. The receiver winding does not distinguish between the electromagnetic and electrostatic contributions made by the two halves of the transmitter winding to the induced signal and merely "sees" the end voltage resulting from the vectorial sum of the contributions. By adjustment of the trimming circuit means the resultant voltage, in which there is represented both the electromagnetic and the electrostatic induction effect, is reduced to a negligible level.

The two transmitter winding halves 10 and 11 as shown in FIG. 2 are positioned within a polarizing magnetic flux extending at right angles to the plane of the paper between the two pole pieces of a polarizing magnet, not shown, which defines a working gap. The carrier for a sample under analysis is introduced in winding 26 along the axis 29. In the case of a cryogenic magnet, essentially a superconducting solenoid, the sample is introduced axially of the solenoid, and, the receiver winding as well as the transmitter winding are divided into two segments.

In setting up the probe, variable capacitors 18 and 19 (FIG. 2) are adjusted initially to provide a coarse balance of resonance conditions between the two winding halves 10 and 11. This is indicated by a meter 30 which monitors the output of a detector 31 connected to the receiver winding 26, all variable components having first been set to the middle of their range. This preliminary balancing will in general leave a significant standing signal in the winding 26. By alternate adjustments of the variable resistors 20 and 22, on the one hand, and the variable capacitors 21 and 23, on the other, the standing signal may be reduced in a rapidly converging manner. Since the preset coupling due to winding half 10 is in opposition to that due to winding half 11, the amplitude and phase adjustments to the two halves must take place in opposite directions, and, by suitably matching the sensitivities of the controls, resistors 20 and 22 and capacitors 21 and 23 are ganged for differential action. In this manner the balancing operation is expediently performed by operating one control with the left-hand and one with the right while observing meter 30.

The ganged resistors 20 and 22 and the ganged capacitors 21 and 23 are positioned either in the probe itself or at a remote location. When located remotely, it is undesirable in certain circumstances to set up comparatively long RF paths between the probe and its controls. It is advantageous with a remote control arrangement to employ voltage sensitive resistors and capacitors and to effect remote control by adjusting a DC potential applied thereto through DC voltage lines extending any desired distance from the probe.

Figure 3:
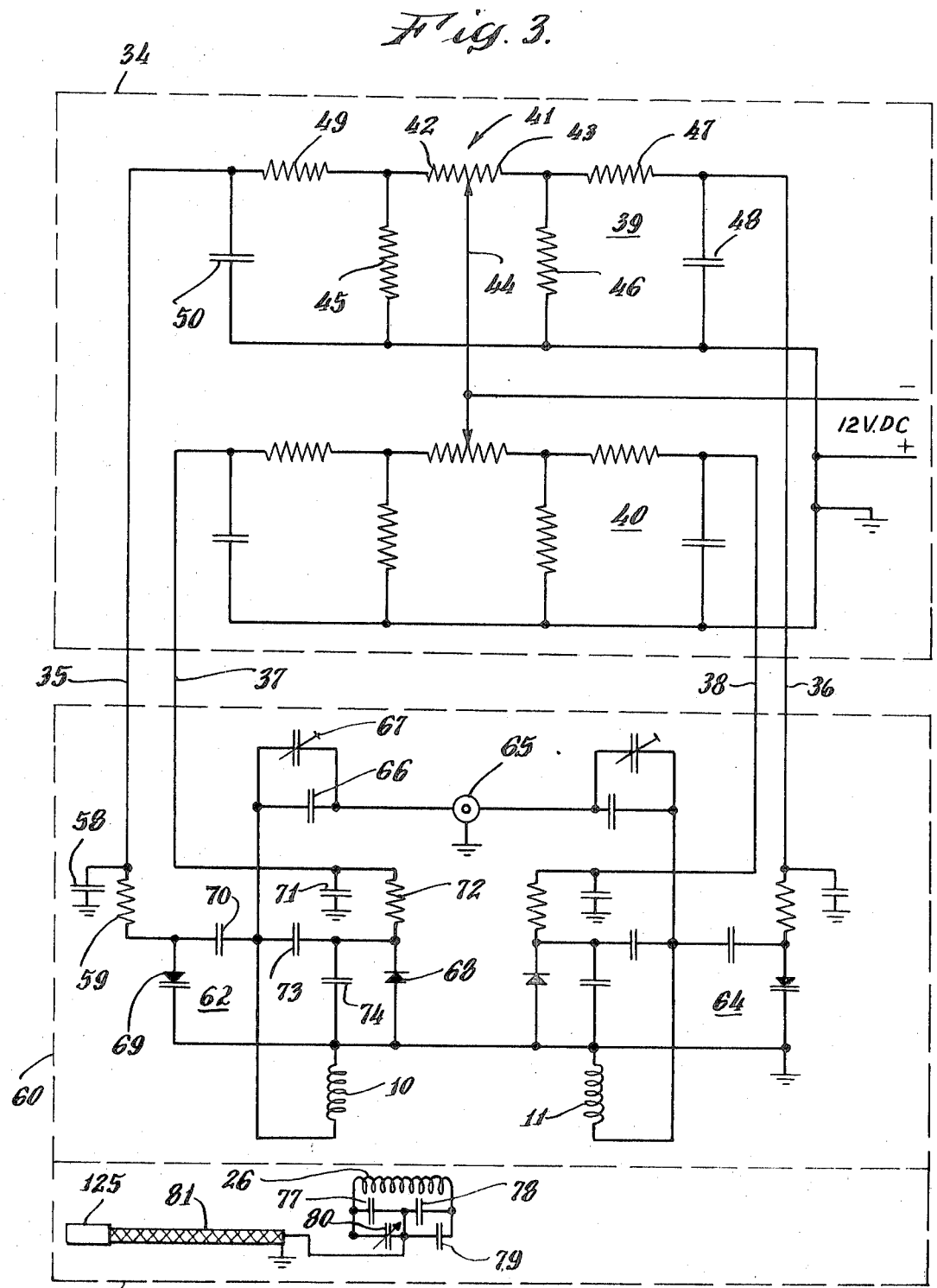
FIG. 3 is a detailed circuit diagram of the probed arrangement of FIG. 1.

A remote probe balance control is illustrated in the circuit diagram of the probe illustrated in FIG. 3. The circuitry enclosed in dashed rectangle 34 provides differentially varying DC levels on lines 35 and 36 for controlling the voltage sensitive capacitors and similar levels on lines 37 and 38 for controlling the voltage sensitive resistors. Rectangle 34 encloses two networks 39 and 40 which are fed in parallel from a common DC supply of 12 volts. The network 39 includes a potentiometer 41 having two sections 42 and 43 located electrically on opposite sides of a slider arm 44. The potentiometer sections 42 and 43 comprise the upper adjacent arms in a Wheatstone bridge circuit. The resistors 45 and 46 represent the lower adjacent arms. If the bridge is in balance, lines 35 and 36 will be at the same potential above ground, and when the slider 44 is moved from the position of balance in one and other direction, the voltages above ground on lines 35 and 36 will vary differentially. A resistor 47 with capacitor 48 form a filter to bypass stray AC voltage to ground, and a similar purpose is served by a resistor 49 and a capacitor 50 on the other side of the network. Network 40 includes similar components for providing voltages on lines 37 and 38 to vary the capacity of voltage sensitive capacitors.

The circuitry arrangement shown within dashed rectangle 60 similarly comprises two networks 62 and 64 illustrated left and right respectively of a coaxial input plug 65 for the RF irradiating power. The network 62 includes capacitors 66 and 67 which together represent the variable capacitance 18 of FIG. 2. A voltage sensitive resistor 68 (PIN diode) is equivalent to the variable resistor 20 of FIG. 2 and a voltage-sensitive capacitor 69 (Varicap) to capacitor 21 of FIG. 2. A capacitor 70 isolates the DC supply from the RF feed to the transmitter winding half 10. A capacitor 58 and a resistor 59 forms an RF filter and prevents RF from entering into the DC supply through line 35. Similarly a capacitor 71 and a resistor 72 form an RF filter for line 37. A capacitor 73 is also provided for blocking the DC voltage which is applied to PIN diode 68 from being applied to the winding 10. The capacitor 73 forms in addition a potential divider in conjunction with a capacitor 74, the capacitance values being selected for providing that at the irradiating RF frequency of 60 MHz. the PIN diode 22 "sees" across it a middle-range resistive impedance of 90 ohms, and the winding 10 a corresponding resistive impedance of 3,800 ohms. This impedance transformation is intended for enabling the PIN diode to be operated at the center of its impedance range where the sensitivity of the device, i.e. change of resistance versus DC control current, is linear.

In setting up the probe of FIG. 3, the potentiometer 41 of network 39 and its counterpart in the network 40 are adjusted to the middle of the range and then, with a 60 MHz. signal coupled to socket 65, trimmer 67 and its counterpart in the network 64 are adjusted in turn until transmitter winding half 10 and the winding half 11 are reasonably near resonance and balance, and, in addition, terminate the RF feeder line with its characteristic impedance. By substitution of a resistor having this impedance, it is possible to establish whether the proper impedance matching has been achieved through manipulation of trimmer 67 and its counterpart in network 64. Balance may be monitored as described with respect to FIG. 2 and an indication of resonance may be had by measuring the voltage across winding 10 and the other half 11 in turn.

The dashed rectangle 76 of FIG. 3 is shown to include the receiver winding 26 corresponding to the winding bearing the same reference numeral in FIG. 2. Receiver winding 26 is shunted by capacitors 77, 78, 79 and 80 for terminating the RF line 81 with its characteristic impedance, capacitor 80 being variable to enable the matching to be adjustable.

The components within dashed rectangle 60 of FIG. 3 are are physically mounted within the probe housing in a compartment of a probe described in detail hereinafter. The components within rectangle 34 of FIG. 3 are located at a remote station, with the slider 44 and its counterpart of network 40 operable by means of separate knobs conveniently located on the front of a panel at the station to enable the instrument operator to turn one knob with the left hand and the other with the right while watching a center-zero balance meter (not shown), which is also conveniently mounted on the panel.

FIG. 4 shows a probe structure having a probe head 90, a depending probe body 91 and a probe-body extension 92, each of which is machined from an aluminum block. The probe body 91 is provided with lugs, not shown, for fastening it by means of screws in a recessed part of the underside of probe head 90, and probe-body extension 92 is similarly provided with lugs 93 cooperating with screws 94 fastening the extension 92 to the bottom of probe body 91. Probe body 91 is milled out to define lateral walls 95 and 96, a bottom wall 97 and partition wall 98. Similarly the extension 92 has been machined to define lateral walls 99 and 100, a partition wall 101, upper walls 102 and 103 and lower walls 104 and 105. There are thus defined two vertically spaced integral picture frame openings in the probe body 91 and two horizontally spaced integral openings in probe-body extension 92.

The upper frame in probe body 91 accommodates electronic components associated with the probe balancing function, i.e. components within the dashed rectangle 60 of FIG. 3, with the exception of transmitter winding halves 10 and 11. The lower frame is reserved to electromagnetic windings presently to be described, and the frames in extension 92 house components associated exclusively with the receiver winding, i.e. the capacitors shown within the dashed rectangle 76 of FIG. 3. After the components have been mounted within the frames of probe body 91, front and back cover plates, now shown, are secured over the frames by means of screws engaging in tapped holes 106. Covers are similarly fastened over the frames in extension 92, the walls of which are provided with tapped holes 107. Three separate electrostatically screened compartments are thus defined in a rigid structure which can be accurately reproduced by normal production methods.

The probe head 90, and the walls, 98, 97 and 101 are each provided with a round bore the axis of which is substantially coincident with the longitudinal axis of the probe. The lined up bores are intended to enable a cylindrical sample holder to be positioned for rotation around the probe axis. The bore in the partition wall 98 is formed in an upstanding boss 108 and a nylon bushing 109 is pressed into it until the lower end 110 thereof (FIG. 5) has gone in far enough for the shoulder 111 to abut against the top face of the boss 108. The bushing 109 includes three internal projections 112 forming a bearing for a spinning sample holder in the form of a long glass tube, not shown.

The upper part 113 of the bushing 109 is intended to receive the bottom end of a screening aluminum tube 114 after the latter has been passed into the bore in probe head 90. The tube 114 includes an upper flange 115 located in a recessed part around the center bore in probe head 90, into which fits the underside of a nylon block 117 fixed to probe head 90 by screws 118. The nylon block 117 serves three separate purposes: it bears on the flange 115 pressing tube 114 down against the shoulder 111 of the bushing 109; it holds a replaceable ring 119, provided with inward projections acting as a top bearing for a sample holder and shown enlarged in FIG. 6; and forms part of an air turbine for spinning the sample holder by providing support for an air connector 120 terminating in an air nozzle, not shown, inside cavity 121 wherein a turbine wheel fixed to the top of the sample holder is accommodated when the sample holder is in position in the probe.

The bore running through partition wall 101 is threaded to receive a nylon screw 122 having a plain cylindrical portion 123 with a flat top acting as a thrust bearing for the convex bottom of a sample holder.

The electrical connections from within the probe are brought out through the probe head 90. Receiver windings leads 124 corresponding to coaxial leads 81 of FIG. 3, terminate at a coaxial plug 125 and probe balance leads 126, corresponding to leads 35, 36, 37 and 38 of FIG. 3 terminate at a plug 127. The coaxial transmitter winding connector socket 65 and leads 128 with terminal plug 129 for the field modulation windings are connected on the other side of the head 90.

The probe of FIG. 4 is supported by means such as a plate, not shown, which is mounted on NMR polarizing magnet. The probe is mounted for example over an opening machined in the barrel of a barrel magnet, and enables the instrument operator to insert the probe in the working gap of the magnet and locate it therein with repeatable accuracy, the front of the probe facing one pole face and the back the other pole face. To provide the necessary register, locating dowels, not shown, are inserted on the underside of the probe head 90 which fits into corresponding bores in the supporting plate. When the dowels are made to engage, the probe heat 90 is pressed right down until its underside abuts against the supporting plate. Manipulation of the probe by the operator is facilitated by the provision of a finger hook 130. A finger may be inserted within the hook when the operator desires to pull the probe off its seating for the purpose of withdrawing it from the working gap.

As indicated the probe body 91 includes the transmitter and receiver winding arrangement indicated generally as 131. Referring to the enlarged view of this assembly shown in FIG. 7, a receiver winding 132 comprising a few turns of enamelled copper wire which is closely wound upon a thin-walled glass former 133. An upper end of the wire is led down and close to the outside surface of the winding and run snugly against the bottom end of the wire, the two parallel wire portions being made sufficiently long to reach the extension 92 for connection to the receiver-winding components housed therein. The receiver winding 132, including the end portions, is made fast to the glass former 133 by means of a suitable adhesive. A tubular glass former 14 is positioned coaxially over the former 133 and its internal diameter is chosen so that the inner surface just clears the portion of the wire coming down over the outside of the receiver winding 132. Two symmetrical transmitter windings 135 and 136 which comprise the winding halves 10 and 11 respectively of FIG. 3 are wound in the general shape of a trapezium and are pressed over the glass former 134 in a manner for providing that the unequal lengths of the top and bottom ends of the winding assume an arcuate shape corresponding to the curvature of the former. The two windings are conveniently preformed to the desired shape. Two ends of each winding are soldered to insulated terminal pillars passing through the partition wall 98, one of these pillars being shown as 137 in FIG. 4.

In mounting the winding assembly 131 within the lower frame in the probe body 91 of FIG. 4, the glass former 134, the length of which is slightly less than the height of the opening in the lower frame, is slipped into position, the bottom end thereof being located in the bore in wall 97. A nylon sleeving 138 is then inserted from above and into the bore in boss 108, it being noted that the bushing 109 and the tube 114 are not yet assembled into position at this stage. The sleeving 138 protrudes slightly into the bore of the former 134 and forms a slight forced fit with both bores, and, as a result the former 134 is held in position. The bottom end of the former 133 is secured by means of beeswax and a cylindrical recess at the top of the bore in wall 101 of extension 92 which at the stage of assembly is not yet attached to the probe body 91. The extension 92 is then joined to probe body 91, former 133 is guided into former 134 and extension 92 will press into place, when the top of former 133 will slide through nylon sleeving 138 and the bottom of former 134 will abut against the top of the extension 92 over an annular area around said cylindrical recess. After screws 94 have been secured, beeswax is melted in the region of sleeving 138 as a safeguard against loosening of the parts.

The lower frame of the probe body 91 accommodates, in addition to the winding assembly 131, air-cored field modulation windings 140 and 141, each comprising 260 turns of 36 SWG enamelled copper wire. The leads for the modulation winding emerge at the location 142 from the wall 95 of probe body 91 and proceed along a channel in the wall to two insulated terminal pillars 143. A similar channel in wall 96 accommodates the portion of leads 124 between extension 92 and the underside of probe head 90.

The probe construction of FIG. 4 provides substantial mechanical rigidity combined with efficient electrostatic screening. In addition no valuable gap width has been taken up by the field modulation coils as is the case in known arrangements wherein flat windings are coaxially disposed around the magnetic axis of the polarizing magnet and the overall width of the probe must include the combined thickness of the two windings.

In contrast with known arrangements, we have found that the probe described herein does not generally require rebalancing when different NMR samples not varying greatly in their dielectric loss characteristics are used in succession and a sample spinning technique is employed. We believe that the parallel connection of the transmitter winding segments inherently introduces a measure of electrostatic balancing and the elimination of a Faraday screen increases the effective capacitance between the winding halves and the receiver coil sufficiently to swamp capacitive variations brought about by the insertion of the sample while not introducing a criticality in the balancing of the probe.

The present invention is applicable not only to NMR spectrometers wherein the polarizing flux extends between the pole pieces of a polarizing magnet—either electromagnetic or permanent—but also, with various adaptations, to spectrometers wherein the polarizing flux is that existing at the median region of an ironless solenoid.

In a particular arrangement of the present invention as shown by FIGS. 3 and 4, the following components and parameters which are not to be construed as limiting the invention in any way, can be employed. At a 60 MHz. irradiating frequency and a DC supply voltage of 12v.

Potentiometer 41 (5K)
Resistors 45 & 46 (470)
Resistors 47 & 49 (3.9K)
Resistor 59 (6.8K)
Resistor 72 (3.3K)
Capacitor 66 (6.8p)

Table — Continued

Capacitors 48 & 50 (100μf.)
Capacitor 67 (0-3.3p)
Capacitor 70 (220p)
Capacitor 58 (1000p)
Capacitor 71 (1000p)
Capacitor 77 (12p)
Capacitor 73 (47p)
Capacitor 78 (180p)
Capacitor 74 (270p)
Capacitor 79 (47p)
Capacitor 80 (0-10p)

The winding data for assembly 131:

| Former 133 | Former 134 |
| --- | --- |
| Length 30 mm. | Length 25 mm. |
| Inner diameter 5.5 mm. | Inner diameter 7.3 mm. |
| Outer diameter 6.3 mm. | Outer diameter 8.2 mm. |
| Receiver Winding 132 | Transmitter Winding Halves 135 and 136 |
| Length of Winding 1.5 mm. | Separation between short sides 14 mm. |
| Wire gauge 32 SWG | Length of top short sides 7 mm. |
| Number of turns 6 | length of bottom short side 9 mm. |
| | Gauge of wire 30 SWG |
| | Number of turns 2 |

While I have illustrated and described a particular embodiment of my invention, it will be understood that various modifications may be made therein without departing from the spirit of the invention and the scope of the appended claims.

We claim:

1. A probe arrangement for a Nuclear Magnetic Resonance apparatus comprising:
   a receiver winding positioned adjacent a sample under analysis and coupled to indicating means for sensing and indicating nuclear magnetic resonance of the sample;
   a transmitter winding having first and second spaced segments arranged about said receiver winding;
   means electrically coupling said winding segments in parallel to a source of irradiating RF potential;
   said transmitter winding segments positioned with relation to said receiver winding for establishing a predetermined electromagnetic coupling between each of said segments and the receiver winding for causing a voltage of substantially equal amplitude and of opposite polarity to be induced in said receiver winding by each of said winding segments;
   circuit means coupled to said winding segments of varying the amplitude and the phase of the Rf potential applied to each of said segments;
   said circuit means arranged for varying the voltages induced in the receiver winding by the two segments of the transmitter winding by an amount for reducing a standing signal in the receiver winding to a desired level in the absence of an NMR resonance.

2. the probe arrangement as claimed in claim 9, wherein said transmitter winding segments are shaped to provide said predetermined electromagnetic coupling.

3. The probe arrangement as claimed in claim 2, wherein said transmitter winding segments are each shaped in the general configuration of a trapezium having two oppositely spaced sides of unequal length and are symmetrically mounted around a longitudinal axis of the probe, and wherein the two opposite unequal sides of the trapezium are each equidistantly spaced from said longitudinal axis.

4. The probe arrangement as claimed in claim 3, including a cylindrical former having an outer surface and wherein all sides of the trapezium are positioned on said surface.

5. The probe arrangement as claimed in claim 4, including a second cylindrical former and said receiver winding is mounted on said second cylindrical former and positioned within said first former.

6. The probe arrangement as claimed in claim 1, wherein said transmitter winding segments are of rectangular shape having two shorter sides and are symmetrically positioned about a longitudinal axis of the probe, said two shorter sides of said rectangular-shaped winding segment each spaced from the longitudinal axis by a different distance.

7. The probe arrangement as claimed in claim 1, wherein said circuit means for varying phase and amplitude of the RF signals applied to the transmitter winding segments include circuit means paired and arranged for differential phase control operation with a single control and circuit means paired and arranged for differential amplitude control operation with a single control whereby an instrument user adjusts one control with one hand and the other control with the other hand.

8. The probe arrangement as claimed in claim 7, wherein said circuit means for varying phase and amplitude of the RF signal applied to the transmitter winding signals include circuit elements having a characteristic thereof for varying in magnitude in response to a varying DC potential applied thereto and the probe is thereby remotely balanced with lead lines carrying a DC voltage.

9. The probe arrangement as claimed in claim 1, wherein said winding segments each comprise substantially a half of the transmitter winding.